US012742457B2

(12) United States Patent
Saito et al.

(10) Patent No.: US 12,742,457 B2
(45) Date of Patent: Sep. 22, 2026

(54) IMPELLER

(71) Applicant: CARRIER JAPAN CORPORATION, Tokyo (JP)

(72) Inventors: Soki Saito, Fuji (JP); Kazuya Okura, Fuji (JP); Masayuki Endo, Fuji (JP); Yoshiki Tabata, Fuji (JP); Yoshihiro Komiyama, Fuji (JP)

(73) Assignee: CARRIER JAPAN CORPORATION, Tokyo (JP)

( * ) Notice: Subject to any disclaimer, the term of this patent is extended or adjusted under 35 U.S.C. 154(b) by 0 days.

(21) Appl. No.: 19/196,685

(22) Filed: May 1, 2025

(65) Prior Publication Data

US 2025/0347293 A1 Nov. 13, 2025

(30) Foreign Application Priority Data

May 10, 2024 (JP) ................................ 2024-077363
Apr. 21, 2025 (JP) ................................ 2025-069809

(51) Int. Cl.
*F04D 29/38* (2006.01)
*F04D 19/00* (2006.01)
*F04D 29/32* (2006.01)

(52) U.S. Cl.
CPC ......... *F04D 29/384* (2013.01); *F04D 19/002* (2013.01); *F04D 29/329* (2013.01); *F05D 2240/305* (2013.01); *F05D 2240/306* (2013.01)

(58) Field of Classification Search
CPC ..... F04D 29/329; F04D 29/384; F04D 19/002
See application file for complete search history.

(56) References Cited

U.S. PATENT DOCUMENTS 1,430,486 A * 9/1922 Ayres .................... F04D 29/329 416/204 R
5,655,882 A * 8/1997 Morgan ................ F04D 29/329 416/204 R
6,375,427 B1 * 4/2002 Williams .............. F04D 29/329 416/169 A (Continued)

FOREIGN PATENT DOCUMENTS

CN 104696276 A * 6/2015 ........... F04D 29/329
CN 109469644 A * 3/2019 ............. F04D 29/05

(Continued)

OTHER PUBLICATIONS

Extended European Search Report for Application No. 25174482.7, dated Oct. 1, 2025, 8 pages.

(Continued)

*Primary Examiner* — Eldon T Brockman
(74) *Attorney, Agent, or Firm* — DLA Piper, LLP (US)

(57) ABSTRACT

An impeller includes: a hub portion including an outer peripheral surface; and a plurality of blade portions connected to the outer peripheral surface of the hub portion. The hub portion includes: a cylindrical portion including the outer peripheral surface of the hub portion and an inner peripheral surface; a boss portion for insertion of an output shaft of an electric motor, the boss portion having a cylindrical shape and being disposed at the center of the cylindrical portion; and a connecting portion having a corrugated-plate shape and connecting the inner peripheral surface of the cylindrical portion and an outer peripheral surface of the boss portion.

12 Claims, 11 Drawing Sheets

(56) References Cited

U.S. PATENT DOCUMENTS

2023/0358249 A1 * 11/2023 Tomioka ............... F04D 29/646

FOREIGN PATENT DOCUMENTS

| | | | | | |
|---|---|---|---|---|---|
| CN | 114207290 | A | | 3/2022 | |
| DE | 1428153 | A1 | | 11/1968 | |
| EP | 3872352 | A1 | * | 9/2021 | ........... F04D 29/666 |
| GB | 1157538 | A | | 7/1969 | |
| GB | 1418236 | A | * | 12/1975 | ........... F04D 29/329 |
| GB | 2038426 | A | | 7/1980 | |
| JP | S5578197 | A | | 6/1980 | |
| JP | 2021-032137 | | | 3/2021 | |

OTHER PUBLICATIONS

Office Action for Japanese Patent Application No. 2025-069809, mailed Apr. 7, 2026, 11 pages.

* cited by examiner

IMPELLER

CROSS-REFERENCE TO RELATED APPLICATION

This application claims the benefit of priority of Japanese Patent Application No. 2024-077363, filed on May 10, 2024, and Japanese Patent Application No. 2025-069809, filed on Apr. 21, 2025, the entire contents of both of which are incorporated herein by reference.

BACKGROUND OF THE INVENTION

Field of the Invention

An embodiment of the present invention relates to an impeller.

Description of the Related Art

Fans for outdoor and indoor units provided in an air conditioner are known (for example, Japanese Patent Laid-Open No. 2021-32137). Such a fan includes a resin hub, a plurality of resin blades connected to the hub, and a balancing weight. The part of the hub to which the plurality of blades is connected is referred to as a cylindrical portion. The hub and the plurality of blades of the fan form a so-called impeller. The fan is also referred to as a blower.

SUMMARY OF THE INVENTION

In general, when the blower is in operation, stress concentration tends to occur at a coupling location between the cylindrical portion and the blade due to centrifugal load in the impeller provided in the blower. Excessive stress concentration may cause damage to the impeller. Therefore, to increase the rigidity of the hub and reduce the stress concentration that occurs at the coupling location between the cylindrical portion and the blade, the conventional impeller includes ribs as reinforcing members. The ribs are provided in the hub so as to be fixed to a bottom portion and the cylindrical portion of the hub, and extend radially from a boss portion, which is the part of the hub where a rotary shaft of a fan motor is inserted, to the cylindrical portion.

However, the provision of the ribs increases the weight of the conventional impeller. Thus, it is extremely difficult to achieve both high rigidity and excellent lightness in an impeller.

Therefore, an object of the present invention is to provide an impeller having high rigidity and excellent lightness.

To achieve the above object, an impeller according to an embodiment of the present invention includes a hub portion including an outer peripheral surface; and a plurality of blade portions connected to the outer peripheral surface. The hub portion includes: a cylindrical portion including the outer peripheral surface and an inner peripheral surface; a boss portion for insertion of an output shaft of an electric motor, the boss portion having a cylindrical shape and being disposed at a center of the cylindrical portion; and a connecting portion having a corrugated-plate shape and connecting the inner peripheral surface of the cylindrical portion and an outer peripheral surface of the boss portion.

DETAILED DESCRIPTION

Figure 1:
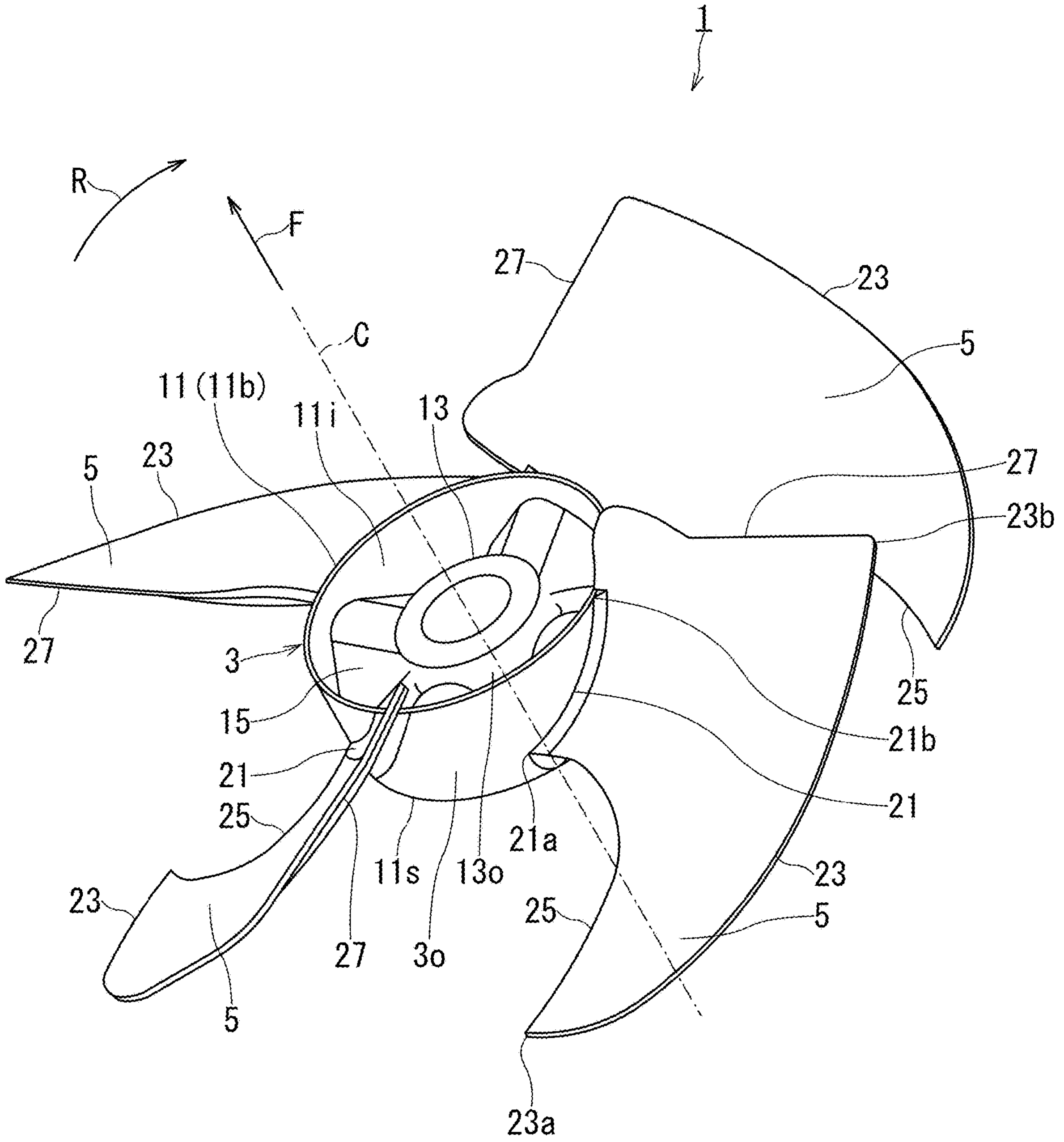
FIG. 1 is a perspective view illustrating an impeller according to an embodiment of the present invention from a blowing side.

An embodiment of an impeller according to the present invention will be described with reference to FIGS. 1 to 15. In the plurality of drawings, the identical or equivalent configurations are denoted by the same reference numerals.

FIG. 1 is a perspective view illustrating the impeller according to the embodiment of the present invention from a blowing side.

As illustrated in FIG. 1, an impeller 1 according to the present embodiment is a so-called axial flow impeller. The impeller 1 is also referred to simply as a propeller. The impeller 1 is attached to a rotary shaft (not illustrated), which is an output shaft of an electric motor (not illustrated) for rotating and driving the impeller 1, and rotates in a rotational direction R about a rotation center line C of the impeller 1 to flow fluid, exclusively air, in a flow direction F. The impeller 1 is applied to an outdoor fan (blower) of an outdoor unit provided in an air conditioner, for example, and is used to blow air to an outdoor heat exchanger of the outdoor unit.

When the impeller 1 is rotated in the opposite direction of the rotational direction R, the fluid flows in the opposite direction of the flow direction F. Hereinafter, each of the expressions "rotational direction," "front side in the rotational direction," "rear side in the rotational direction," "suction side," and "blowing side" is based on a case where the impeller 1 is rotated in the rotational direction R, unless otherwise specified. Furthermore, the expression "suction side" means the side of the impeller 1 where the fluid is sucked into the impeller 1. The expression "blowing side" means the side of the impeller 1 where the fluid is blown out of the impeller 1. Moreover, the expression "rotational axis direction" means a direction along the rotation center line C of the impeller 1, the expression "radial direction" means a direction perpendicular to the rotational axis direction and the rotational direction.

The impeller 1 according to the present embodiment includes: a hub portion 3 including an outer peripheral surface 3*o* and disposed on the rotation center line C; and a plurality of blade portions 5 connected to the outer peripheral surface 3*o* of the hub portion 3. The impeller 1 is integrally molded from resin, for example. The integral molding of the impeller 1 is usually performed by injection molding.

The hub portion 3 has a shape extending in the rotational axis direction of the impeller 1. The hub portion 3 includes: a cylindrical portion 11 including the outer peripheral surface 3*o* of the hub portion 3, and an inner peripheral surface 11*i*; a boss portion 13 for insertion of a rotary shaft of the electric motor, the boss portion having a cylindrical shape and being disposed in the center of the cylindrical portion 11; and a connecting portion 15 connecting the inner peripheral surface 11*i* of the cylindrical portion 11 and an outer peripheral surface 13*o* of the boss portion 13. The outer peripheral surface 3*o* of the hub portion 3 is also the outer peripheral surface of the cylindrical portion 11.

The cylindrical portion 11 is a member that extends in the rotational axis direction of the impeller 1, that is, includes a suction-side end surface 11*s* located on the suction side and a blowing-side end surface 11*b* located on the blowing side and extends from the suction-side end surface 11*s* toward the blowing-side end surface 11*b*. The outer shape of the cylindrical portion 11 is, in plan view, a substantially circular shape, a substantially triangular shape, or a substantially polygonal shape having more than three sides, for example. That is, the outer shape of the hub portion 3 is also, in plan view, a substantially circular shape, a substantially triangular shape, or a substantially polygonal shape having more than three sides.

The boss portion 13 is a member that extends in the rotational axis direction of the impeller 1, that is, includes a suction-side end surface 13*s* located on the suction side and a blowing-side end surface 13*b* located on the blowing side and extends from the suction-side end surface 13*s* toward the blowing-side end surface 13*b*. The boss portion 13 is disposed on the rotation center line of the hub portion 3, that is, on the rotation center line C of the impeller 1. The output shaft of the electric motor is fixed to the boss portion 13. That is, the impeller 1 is connected to the electric motor through the boss portion 13 fixed to the output shaft. The boss portion 13 has, for example, a substantially circular shape in plan view.

The plurality of blade portions 5 project radially from the outer peripheral surface 3*o* of the hub portion 3, that is, the cylindrical portion 11. The plurality of blade portions 5 are arranged at equal intervals along the outer peripheral surface 3*o* of the hub portion 3 in a circumferential direction, that is, in the rotational direction R of the impeller 1. The number of the plurality of blade portions 5 can be changed as appropriate. In the example of FIG. 1, the number of the plurality of blade portions 5 is four. The four blade portions 5 are arranged at intervals of 90° in the circumferential direction of the hub portion 3. Each blade portion 5 is disposed on the outer peripheral surface 3*o* of the hub portion 3 while being inclined.

The blade portion 5 is formed in a plate shape and includes an inner peripheral edge portion 21, an outer peripheral edge portion 23, a leading edge portion 25, and a trailing edge portion 27.

The inner peripheral edge portion 21 is an end portion of the blade portion 5 on the inner side in the radial direction of the impeller 1 and is connected to the outer peripheral surface 3*o* of the hub portion 3 so as to extend therealong. In other words, the inner peripheral edge portion 21 is a root of the blade portion 5 relative to the outer peripheral surface 3*o*. The inner peripheral edge portion 21 is inclined toward the blowing side from a front inner peripheral edge portion 21*a*, which is the front side in the rotational direction, to a rear inner peripheral edge portion 21*b*, which is the rear side in the rotational direction.

The outer peripheral edge portion 23 is an end portion of the blade portion 5 on the outer side in the radial direction of the impeller 1. The outer peripheral edge portion 23 is inclined toward the blowing side from a front outer peripheral edge portion 23*a*, which is the front side in the rotational direction, to a rear outer peripheral edge portion 23*b*, which is the rear side in the rotational direction. The circumferential length of the outer peripheral edge portion 23 is larger than the circumferential length of the inner peripheral edge portion 21.

The leading edge portion 25 is an end portion of the blade portion 5 on the front side in the rotational direction. The leading edge portion 25 is the part that leads a wind flow in the rotational direction R of the impeller 1. The leading edge portion 25 connects the front inner peripheral edge portion 21*a* and the front outer peripheral edge portion 23*a*.

The trailing edge portion 27 is an end portion of the blade portion 5 on the rear side in the rotational direction. The trailing edge portion 27 connects the rear inner peripheral edge portion 21*b* and the rear outer peripheral edge portion 23*b*.

The front inner peripheral edge portion 21*a* of each blade portion 5 is located near the suction-side end surface 11*s* of the cylindrical portion 11. However, the front inner peripheral edge portion 21*a* of each blade portion 5 is not limited to the above and may be located so as to be continuous with the suction-side end surface 11*s* of the cylindrical portion 11. Furthermore, the rear inner peripheral edge portion 21*b* of each blade portion 5 is located so as to be continuous with the blowing-side end surface 11*b* of the cylindrical portion 11. However, the rear inner peripheral edge portion 21*b* of each blade portion 5 is not limited to the above and only needs to be located near the blowing-side end surface 11*b*.

Next, the connecting portion 15 of the hub portion 3 will be described in detail.

Figure 2:
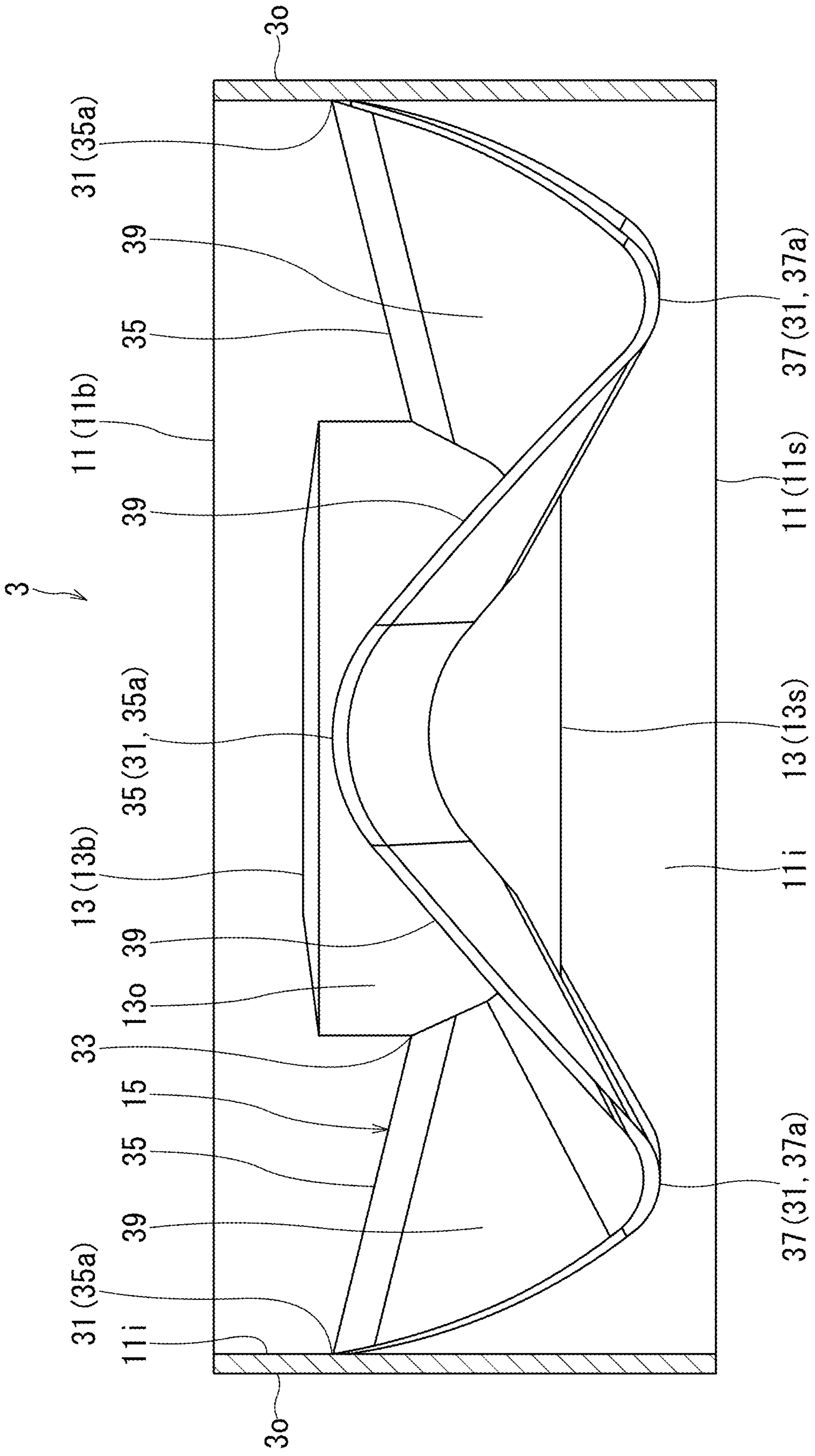
FIG. 2 is a side view illustrating a hub portion of the impeller according to the embodiment of the present invention.

FIG. 2 is a side view illustrating the hub portion of the impeller according to the embodiment of the present invention.

Note that FIG. 2 illustrates the hub portion 3 of the impeller 1 provided with four blade portions 5. Furthermore, for convenience of description, the cylindrical portion 11 of the hub portion 3 in the front half of FIG. 2 is omitted from illustration.

Figure 3A:
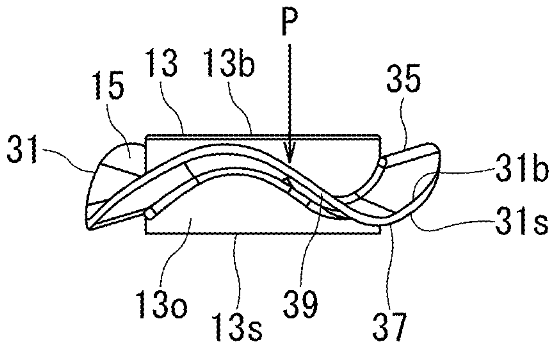
FIG. 3A is a side view illustrating a connecting portion of the impeller according to the embodiment of the present invention.
Figure 3B:
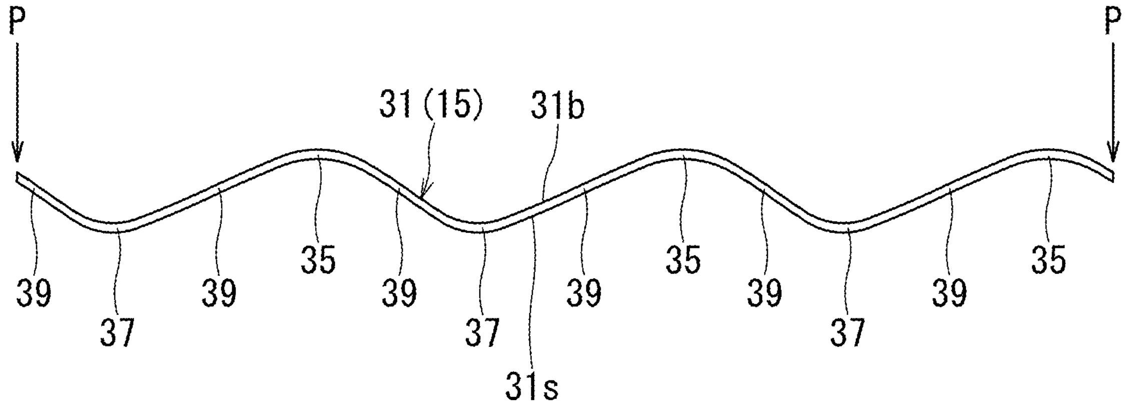
FIG. 3B is a schematic view of a cylindrical-portion-side edge portion of the connecting portion in the impeller according to the embodiment of the present invention, developed over 360°.

FIG. 3A is a side view illustrating the connecting portion of the impeller according to the embodiment of the present invention. FIG. 3B is a schematic view of a cylindrical-portion-side edge portion of the connecting portion in the impeller according to the embodiment of the present invention, developed over 360°.

Note that FIG. 3A is a view of the hub portion 3 in which the cylindrical portion 11 is not illustrated. FIG. 3B is a view of a cylindrical-portion-side edge portion 31 of the connecting portion 15, which is provided along the inner peripheral surface 11*i* of the cylindrical portion 11, and is developed over 360° from a position indicated by an arrow P in FIG. 3A. FIGS. 3A and 3B illustrate the connecting portion 15 of the impeller 1 provided with three blade portions 5.

There are cases where the impeller 1 may not be sufficiently rigid if the connecting portion 15 of the hub portion 3 simply has a flat-plate shape. In such cases, stress concentration may occur at a coupling location between the cylindrical portion 11 and the blade portion 5 in the impeller 1 during operation of the blower provided with the impeller 1, resulting in damage. On the other hand, when a plurality of ribs, which are radially formed from the outer peripheral surface 13*o* of the boss portion 13 to the inner peripheral surface 11*i* of the cylindrical portion 11 and extend in the rotational axis direction, are provided on the connecting portion 15 having a flat-plate shape to reduce the stress concentration, the weight of the impeller 1 increases due to the provision of the plurality of ribs, and the lightness of the impeller 1 is impaired. Such an impeller, in which the connecting portion connecting the cylindrical portion and the boss portion has a flat-plate shape and a plurality of ribs are provided on the flat-plate-shaped connecting portion, may be hereinafter referred to as an "impeller of conventional structure."

As illustrated in FIGS. 2, 3A and 3B in addition to FIG. 1, in the impeller 1 according to the present embodiment, the connecting portion 15 of the hub portion 3 has a corrugated-plate shape.

Specifically, the corrugated-plate-shaped connecting portion 15 includes the cylindrical-portion-side edge portion 31 provided along the inner peripheral surface 11*i* of the cylindrical portion 11, and a boss-portion-side edge portion 33 provided along the outer peripheral surface 13*o* of the boss portion 13. The connecting portion 15 is connected to the inner peripheral surface 11*i* of the cylindrical portion 11 through the cylindrical-portion-side edge portion 31 and is connected to the outer peripheral surface 13*o* of the boss portion 13 through the boss-portion-side edge portion 33. Note that the cylindrical-portion-side edge portion 31 includes a blowing-side edge 31*b* located on the blowing side and a suction-side edge 31*s* located on the suction side.

Furthermore, the corrugated-plate-shaped connecting portion 15 includes: a plurality of blowing-side top portions 35 that extend radially from the outer peripheral surface 13*o* of the boss portion 13 to the inner peripheral surface 11*i* of the cylindrical portion 11 and are convex on the blowing side; a plurality of suction-side top portions 37 that extend radially from the outer peripheral surface 13*o* of the boss portion 13 to the inner peripheral surface 11*i* of the cylindrical portion 11 and are convex on the suction side; and a plurality of coupling portions 39 that couple the adjacent blowing-side top portions 35 to the suction-side top portions 37. In other words, the corrugated-plate-shaped connecting portion 15 is wavy in the circumferential direction of the hub portion 3 between the cylindrical portion 11 and the boss portion 13.

Each blowing-side top portion 35 is inclined toward the blowing side, from the outer peripheral surface 13*o* of the boss portion 13 to the inner peripheral surface 11*i* of the cylindrical portion 11. In the example of FIG. 2, an outermost edge portion 35*a* of each blowing-side top portion 35 is located closer to the suction side than the blowing-side end surface 11*b* of the cylindrical portion 11. However, the outermost edge portion 35*a* is not limited to the above and may be located so as to be continuous with the blowing-side end surface 11*b*. Note that the outermost edge portion 35*a* is included in the cylindrical-portion-side edge portion 31 of the connecting portion 15, and is the part of the blowing-side top portion 35 that is farthest from the boss portion 13 in the radial direction.

Each suction-side top portion 37 is inclined toward the suction side, from the outer peripheral surface 13*o* of the boss portion 13 to the inner peripheral surface 11*i* of the cylindrical portion 11. In the example of FIG. 2, an outermost edge portion 37*a* of each suction-side top portion 37 is located closer to the blowing side than the suction-side end surface 11*s* of the cylindrical portion 11. However, the outermost edge portion 37*a* is not limited to the above and may be located so as to be continuous with the suction-side end surface 11*s*. Note that the outermost edge portion 37*a* is included in the cylindrical-portion-side edge portion 31 of the connecting portion 15 and is the part of the suction-side top portion 37 that is farthest from the boss portion 13 in the radial direction.

The number of the plurality of blowing-side top portions 35 corresponds to the number of the plurality of suction-side top portions 37. Furthermore, the number of the plurality of blowing-side top portions 35 and the number of the plurality of suction-side top portions 37 correspond to the number of the blade portions 5.

The plurality of coupling portions 39 are inclined toward the suction side or the blowing side. The plurality of coupling portions 39 are connected to the inner peripheral surface 11*i* of the cylindrical portion 11 through the cylindrical-portion-side edge portion 31 while being inclined, and are connected to the outer peripheral surface 13*o* of the boss portion 13 through the boss-portion-side edge portion 33 while being inclined.

Figure 4:
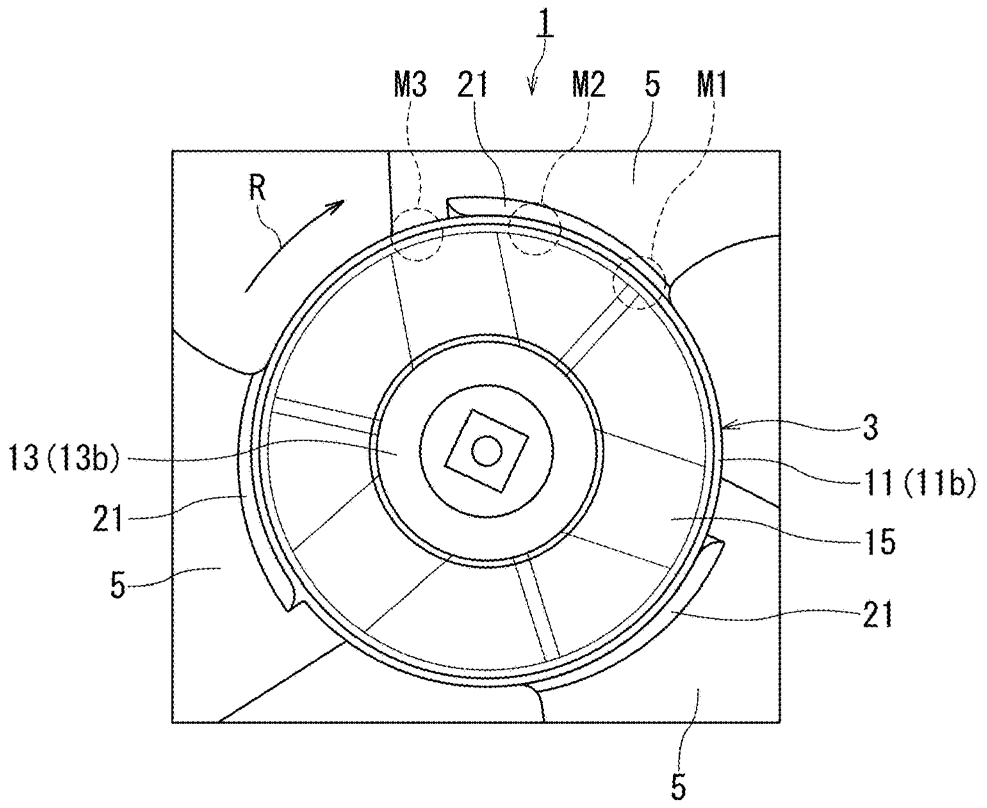
FIG. 4 is a view illustrating parts for evaluation where stress is generated in the hub portion of the impeller according to the embodiment of the present invention.

FIG. 4 is a view illustrating parts for evaluation where stress is generated in the hub portion of the impeller according to the embodiment of the present invention. Note that FIG. 4 is a plan view illustrating the impeller 1 from the blowing side.

In the process of finding the corrugated-plate-shaped connecting portion 15 as described above, the inventors performed an analysis described below regarding rigidity and lightness of the impeller 1, and made comparison with those of the impeller of conventional structure.

As an example of the analysis, calculation was performed to obtain centrifugal load (stress) generated in each of the parts of the hub portion 3 at positions M1 to M3 illustrated in FIG. 4, when the impeller 1 provided with three blade portions 5 was rotated in the rotational direction R. In the example illustrated in FIG. 4, the positions M1 to M3 are arranged at equal intervals of 30° along the circumferential direction of the hub portion 3. The positions M1 to M3 are locations at or near the coupling location between the cylindrical portion 11 and the blade portion 5, and where stress concentration tends to occur when the impeller 1 is rotated.

The results of the analysis show that, when stress generated at each of locations corresponding to positions M1 to M3 of the hub portion of the impeller of conventional structure, including three blade portions in the same manner, was set to 100%, stress generated at any of the positions M1 to M3 was 70% or less. That is, it was confirmed that the corrugated-plate-shaped connecting portion 15 improves the rigidity of the hub portion 3 at the coupling location between the cylindrical portion 11 and the blade portion 5, and that the generated stress is reduced by 30% or more, compared to the hub portion of the impeller of conventional structure.

As another example of the analysis, calculation was performed to obtain centrifugal load (stress) generated in the entire area of the hub portion 3 when the impeller 1, including the three blade portions 5 illustrated in FIG. 4, was rotated in the rotational direction R. Furthermore, the mass of only the hub portion 3 was calculated.

As a result of the analysis, when stress generated in the entire area of the hub portion of the impeller of conventional structure, including three blade portions in the same manner, was set to 100%, stress generated in the entire area of the hub portion 3 was 67.8%. Moreover, when the mass of the hub portion of the impeller of conventional structure was set to 100%, the mass of the hub portion 3 was 82.2%. That is, it was confirmed that the corrugated-plate-shaped connecting portion 15 improves the overall rigidity and lightness of the hub portion 3, and that the generated stress is reduced by 30% or more and the mass is reduced by 17% or more, compared to the hub portion of the impeller of conventional structure.

As still another example of the analysis, calculation was performed to obtain centrifugal load (stress) generated in the entire area of the hub portion 3 when the impeller 1, including the four blade portions 5 illustrated in FIG. 1, was rotated in the rotational direction R. Furthermore, the mass of only the hub portion 3 was calculated.

As a result of the analysis, when stress generated in the entire area of the hub portion of the impeller of conventional structure, including four blade portions in the same manner, was set to 100%, stress generated in the entire area of the hub portion 3 was 87.2%. Moreover, when the mass of the hub portion of the impeller of conventional structure was set to 100%, the mass of the hub portion 3 was 67.7%. That is, it was confirmed that the corrugated-plate-shaped connecting portion 15 improves the overall rigidity and lightness of the hub portion 3, and that the generated stress is reduced by 12% or more and the mass is reduced by 30% or more, compared to the hub portion of the impeller of conventional structure.

The inventors clarified that the impeller 1 including the corrugated-plate-shaped connecting portion 15 would improve the lightness while increasing the rigidity and reducing the generated stress.

Note that the hub portion 3 may include a plurality of ribs in the connecting portion 15 to the extent that the lightness is not impaired. The plurality of ribs is formed radially from the outer peripheral surface 13*o* of the boss portion 13 to the inner peripheral surface 11*i* of the cylindrical portion 11 and extend in the rotational axis direction.

Figure 5:
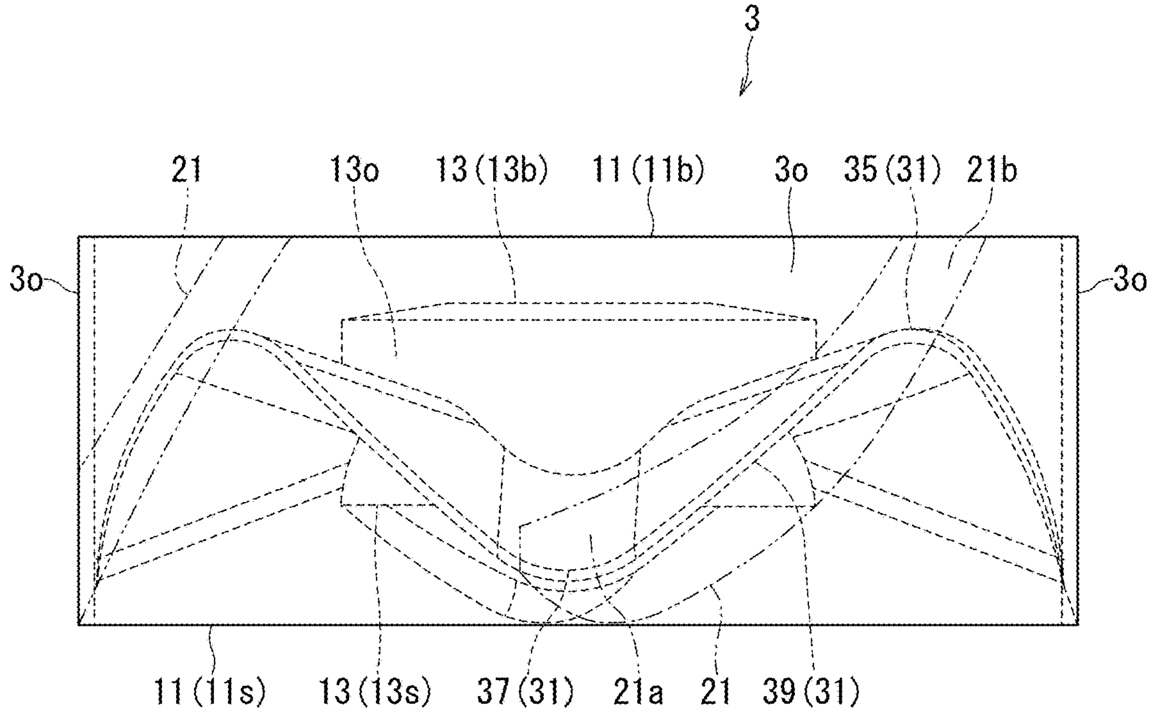
FIG. 5 is a view illustrating a positional relationship between the connecting portion and a blade portion of the impeller according to the embodiment of the present invention.

FIG. 5 is a view illustrating a positional relationship between the connecting portion and the blade portion of the impeller according to the embodiment of the present invention.

Note that FIG. 5 illustrates the connecting portion 15 when the number of the blade portions 5 is three. The boss portion 13 and the connecting portion 15 seen inside the hub portion 3 are indicated by dotted lines, and the inner peripheral edge portion 21 of the blade portion 5 provided on the outer peripheral surface 3*o* of the hub portion 3, that is, the outer peripheral surface 3*o* of the cylindrical portion 11, is indicated by double-dotted lines.

In general, during cooling after injection molding of the impeller, a sink mark can occur on the inner peripheral surface of the cylindrical portion facing the inner peripheral edge portion of the blade portion, associated with contraction of the molten resin material. This sink mark reduces rigidity at the connecting part between the cylindrical portion and the blade portion, causing stress concentration.

Therefore, as illustrated in FIG. 5, the cylindrical-portion-side edge portion 31 of the connecting portion 15 may be provided substantially along the inner peripheral edge portion 21 of the blade portion 5, with the cylindrical portion 11 interposed between the cylindrical-portion-side edge portion 31 and the inner peripheral edge portion 21. Thus, the cylindrical-portion-side edge portion 31 of the connecting portion 15 is provided over most of the location, on the inner peripheral surface 11*i* of the cylindrical portion 11, that faces the inner peripheral edge portion 21 of the blade portion 5. Therefore, during cooling after injection molding of the impeller 1, the cylindrical-portion-side edge portion 31 of the connecting portion 15 and the inner peripheral edge portion 21 of the blade portion 5 evenly contract, with the cylindrical portion 11 interposed therebetween, thereby reducing the occurrence of a sink mark. With such a configuration of the impeller 1, it is also possible to cut the part of the hub portion 3 where the cylindrical-portion-side edge portion 31 and the inner peripheral edge portion 21 are not provided in the impeller 1 of the present embodiment. Therefore, the lightness of the hub portion 3 can be further improved without excessively reducing the rigidity of the impeller 1.

Figure 6A:
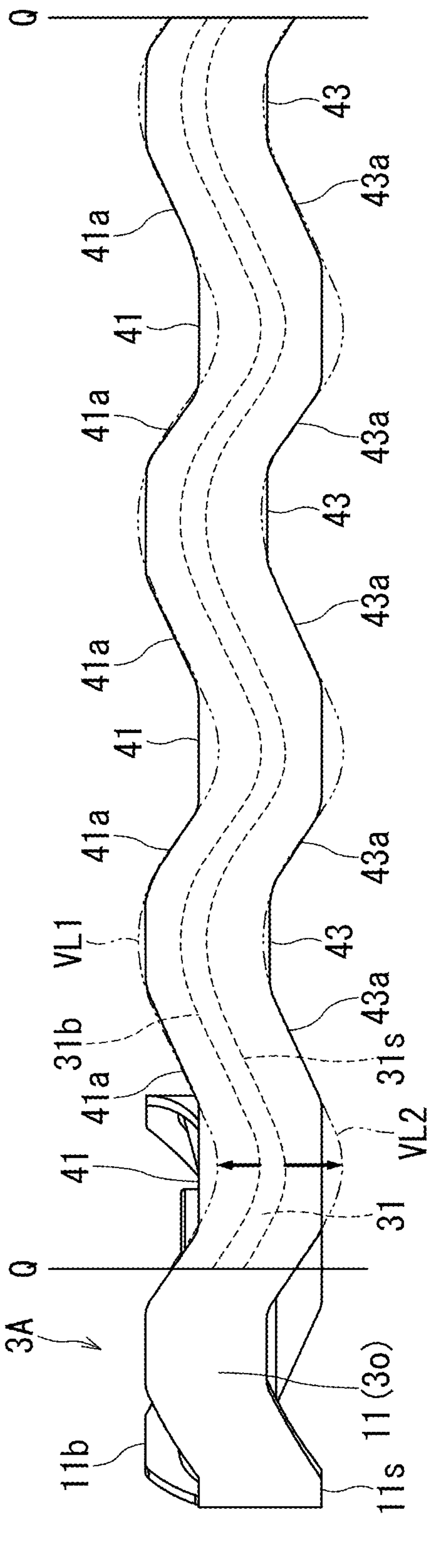
FIG. 6A is a schematic view illustrating a positional relationship, in a hub portion of a second aspect of the impeller according to the embodiment of the present invention, between the cylindrical-portion-side edge portion of the connecting portion and first and second notch portions provided in the cylindrical portion.
Figure 6B:
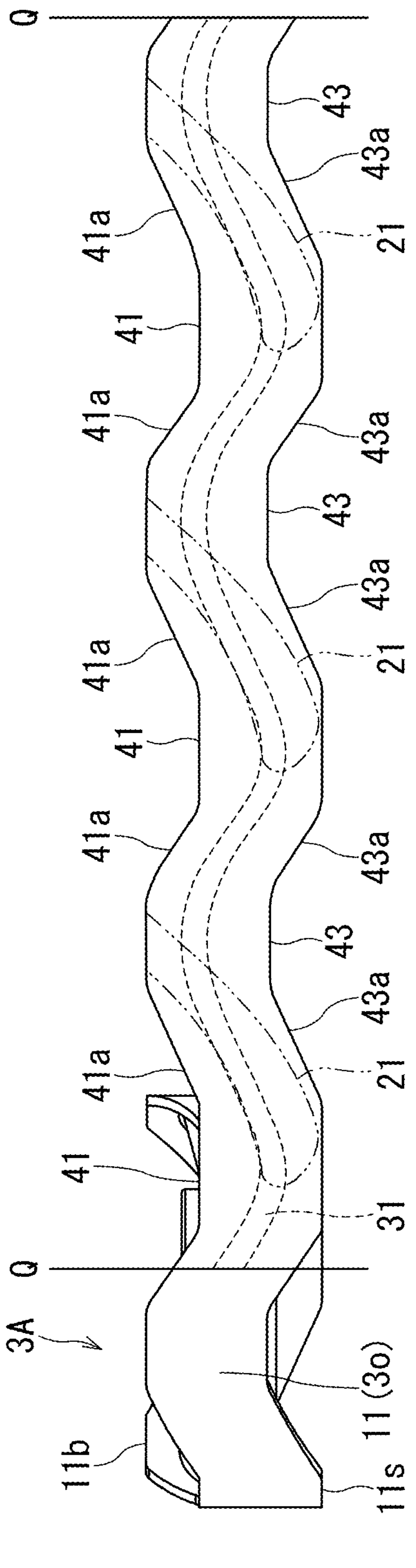
FIG. 6B is a schematic view illustrating the positional relationship, in the hub portion of the second aspect of the impeller according to the embodiment of the present invention, between the first and second notch portions and an inner peripheral edge portion of the blade portion.

FIG. 6A is a schematic view illustrating a positional relationship, in a hub portion of a second aspect of the impeller according to the embodiment of the present invention, between the cylindrical-portion-side edge portion of the connecting portion and first and second notch portions provided in the cylindrical portion, and FIG. 6B is a schematic view illustrating the positional relationship, in the hub portion of the second aspect of the impeller according to the embodiment of the present invention, between the first and second notch portions and an inner peripheral edge portion of the blade portion.

Note that duplicate descriptions are omitted for the hub portion 3 of the first aspect, and a hub portion 3A of a second aspect, a hub portion 3B of a third aspect, and a hub portion 3C of a fourth aspect, which will be described hereinafter. The hub portion 3A of the second aspect may hereinafter be referred to simply as the hub portion 3A. FIGS. 6A and 6B are schematic views in which the outer peripheral surface 3*o* of the hub portion 3A is developed over 360° from a reference line Q. In each of FIGS. 6A and 6B, the cylindrical-portion-side edge portion 31 of the connecting portion 15 provided on the inner peripheral surface 11*i* of the cylindrical portion 11, facing the outer peripheral surface 3*o* of the hub portion 3A, is indicated by dotted lines. Furthermore, in FIG. 6B, the inner peripheral edge portion 21 of the blade portion 5 provided on the outer peripheral surface 3*o* of the hub portion 3A is indicated by a double-dotted line.

Figure 7A:
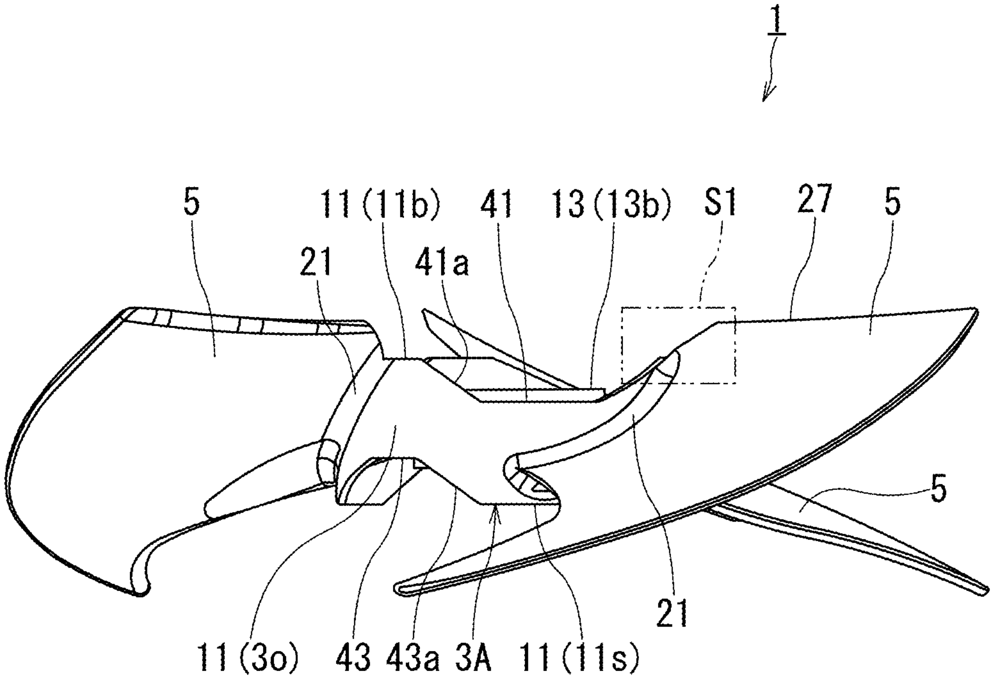
FIG. 7A is a side view of the impeller according to the embodiment of the present invention, provided with the hub portion of the second aspect.
Figure 7B:
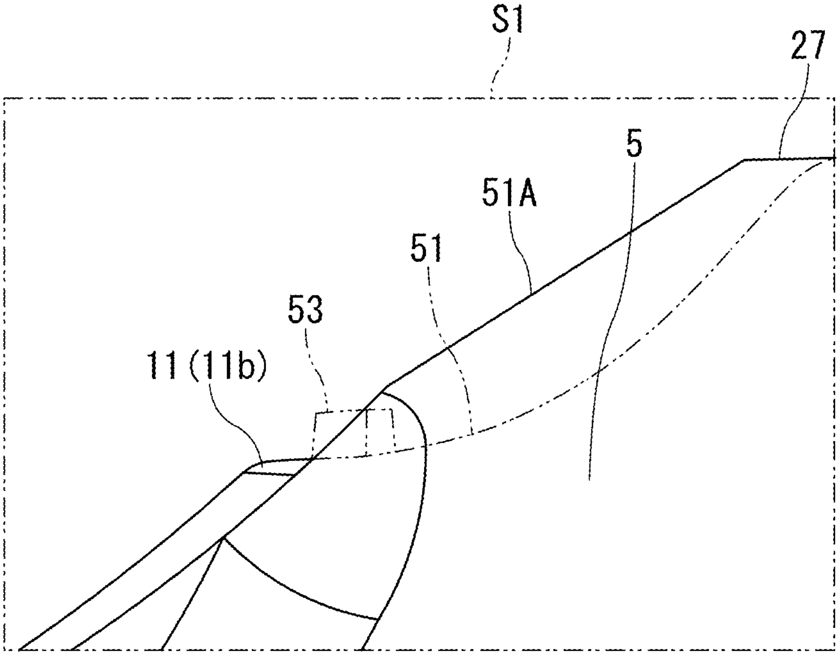
FIG. 7B is an enlarged view of a region S1 surrounded by the double-dotted square in FIG. 7A.

FIG. 7A is a side view of the impeller according to the embodiment of the present invention, provided with the hub portion of the second aspect, and FIG. 7B is an enlarged view of a region S1 surrounded by the double-dotted square in FIG. 7A;

As illustrated in FIG. 6A, the cylindrical portion 11 of the hub portion 3A may be provided substantially along a first virtual line VL1, which corresponds to the blowing-side edge 31*b* of the cylindrical-portion-side edge portion 31 of the connecting portion 15 offset toward the blowing side, and a second virtual line VL2, which corresponds to the suction-side edge 31*s* of the cylindrical-portion-side edge portion 31 of the connecting portion 15 offset toward the suction side. In other words, the cylindrical portion 11 of the hub portion 3A may include a plurality of first notch portions 41 provided substantially along the first virtual line VL1 from the blowing-side end surface 11*b* of the cylindrical portion 11, and a plurality of second notch portions 43 provided substantially along the second virtual line VL2 from the suction-side end surface 11*s* of the cylindrical portion 11. That is, the cylindrical portion 11 may be cut substantially along the first virtual line VL1 and the second virtual line VL2, and the plurality of first notch portions 41 and the plurality of second notch portions 43 may be provided in the cylindrical portion 11. In addition to FIG. 6A, the blowing-side end surface 11*b* and the suction-side end surface 11*s* of the cylindrical portion 11 each have a corrugated shape, as illustrated in FIG. 7A. In other words, the side surface of the cylindrical portion 11, that is, the outer peripheral surface 3*o*, has a corrugated shape.

Note that each of the plurality of first notch portions 41 each has first inclined portions 41*a* that are inclined from the blowing side to the suction side, and each of the plurality of second notch portions 43 has second inclined portions 43*a* that are inclined from the suction side to the blowing side. The first inclined portion 41*a* is also a part of the corrugated-shaped blowing-side end surface 11*b*, and the second inclined portion 43*a* is also a part of the corrugated-shaped suction-side end surface 11*s*. In other words, the corrugated-shaped blowing-side end surface 11*b* includes a plurality of first inclined portions 41*a*, and the corrugated-shaped suction-side end surface 11*s* includes a plurality of second inclined portions 43*a*. Furthermore, the first notch portion 41 does not necessarily need to be provided along the first virtual line VL1. Similarly, the second notch portion 43 does not necessarily need to be provided along the second virtual line VL2. In the example illustrated in FIG. 6A, the first notch portion 41 and the second notch portion 43 each have a substantially trapezoidal shape when viewed from the outside in the radial direction of the hub portion 3A. The first notch portion 41 and the second notch portion 43 are alternately arranged in the circumferential direction of the hub portion 3A, that is, in the circumferential direction of the cylindrical portion 11.

As illustrated in FIG. 6B, the first notch portion 41 and the second notch portion 43 correspond to the portion of the cylindrical portion 11 where neither the cylindrical-portion-side edge portion 31 nor the inner peripheral edge portion 21 is provided. In other words, the cylindrical portion 11 includes the plurality of first notch portions 41 and the plurality of second notch portions 43 so as to avoid the cylindrical-portion-side edge portion 31 and the inner peripheral edge portion 21. The plurality of first notch portions 41 and the plurality of second notch portions 43 provided in the cylindrical portion 11 in this manner would not impair the rigidity required for the impeller 1. Therefore, the plurality of first notch portions 41 and the plurality of second notch portions 43 improve the lightness of the hub portion 3A and, consequently, the impeller 1.

Figure 8:
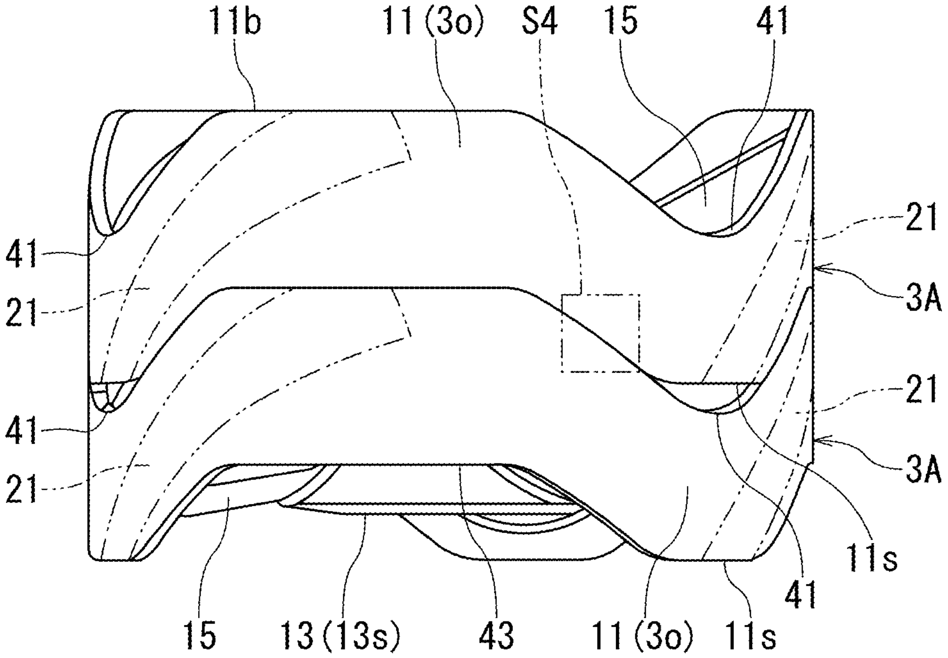
FIG. 8 is a side view of a plurality of hub portions of the second aspect in a state where a plurality of impellers illustrated in FIG. 7A are stacked.

FIG. 8 is a side view of a plurality of hub portions of the second aspect in a state where a plurality of impellers illustrated in FIG. 7A are stacked.

As illustrated in FIG. 8, when a plurality of impellers 1 are stacked in the rotational axis direction, the suction-side end surface 11*s* of the cylindrical portion 11 of the upper impeller 1 and the blowing-side end surface 11*b* of the cylindrical portion 11 of the lower impeller 1 fit together, reducing displacement in the rotational direction, by the cylindrical portion 11 including the plurality of first notch portions 41 and the plurality of second notch portions 43. Therefore, when a plurality of impellers 1 are stacked during transportation, collapse of cargo is unlikely to occur. Further, by the suction-side end surface 11*s* of the cylindrical portion 11 of the upper impeller 1 and the blowing-side end surface 11*b* of the cylindrical portion 11 of the lower impeller 1 fitting together, the stacking height is reduced when a plurality of impellers 1 are stacked. As an example, in a case where the height of five impellers not including the plurality of first notch portions 41 and the plurality of second notch portions 43, when stacked, was set to 100%, the height of seven impellers 1 including the plurality of first notch portions 41 and the plurality of second notch portions 43, when stacked, was 98.4%. That is, the impellers 1 exhibit excellent space-saving properties when stacked. Therefore, the impeller 1 including the plurality of first notch portions 41 and the plurality of second notch portions 43 can improve the space-saving properties when a plurality of impellers 1 are stacked, and significantly reduce transportation and storage costs.

Figure 9:
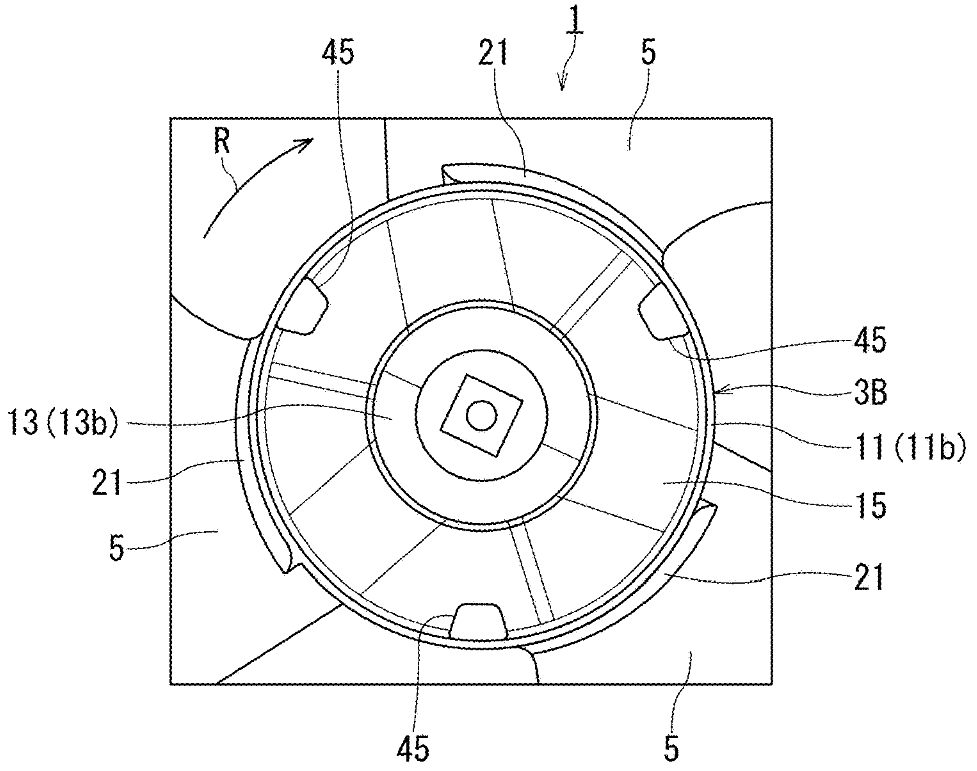
FIG. 9 is a plan view illustrating a vicinity of a hub portion of a third aspect of the impeller according to the embodiment of the present invention from the blowing side.

FIG. 9 is a plan view illustrating a vicinity of the hub portion of the third aspect of the impeller according to the embodiment of the present invention from the blowing side.

As illustrated in FIG. 9, the connecting portion 15 of the hub portion 3B may include a plurality of drain holes 45.

Specifically, the drain holes 45 each have a substantially rectangular shape (substantially trapezoidal shape), with the opening width increasing from the center side of the hub portion 3B toward the outer periphery side. The drain holes 45 have a shape that is linearly symmetrical with respect to a virtual line extending in the radial direction of the hub portion 3B.

Generally, the number of the plurality of drain holes 45 preferably coincides with the number of the plurality of blade portions 5 to balance the impeller 1 when rotated. In the example of FIG. 9, the number of the plurality of blade portions 5 is three, and the number of the plurality of drain holes 45 is three. The three drain holes 45 are arranged in the connecting portion 15 at equal intervals of 120° along the circumferential direction of the hub portion 3B. For example, if the number of the plurality of blade portions 5 is four, the number of the plurality of drain holes 45 is four. The four drain holes 45 are arranged in the connecting portion 15 at equal intervals of 90° along the circumferential direction of the hub portion 3B.

With the plurality of drain holes 45 having such a configuration, when the impeller 1 is applied to the outdoor fan of the outdoor unit of the air conditioner, moisture, such as rainwater and snowmelt, that accumulates in the hub portion 3B is properly drained. In addition, by providing the plurality of drain holes 45, the hub portion 3B can achieve further lightness.

Each of the drain holes 45 may be provided between the inner peripheral edge portions 21 of the adjacent blade portions 5 in the rotational direction R of the impeller 1. By doing so, the rigidity of the hub portion 3B is maintained without being reduced. That is, the hub portion 3B improves drainability and lightness without reducing rigidity. The plurality of drain holes 45 are provided in the inclined coupling portion 39, so that moisture accumulating in the hub portion 3B is easily drained by the action of gravity, as the moisture flows down the inclined coupling portion 39. Further, the plurality of drain holes 45 are provided near the outer periphery of the hub portion 3B, so that moisture accumulating in the hub portion 3B is easily drained by the centrifugal force of the rotating impeller 1, as the moisture flows outward.

Figure 10:
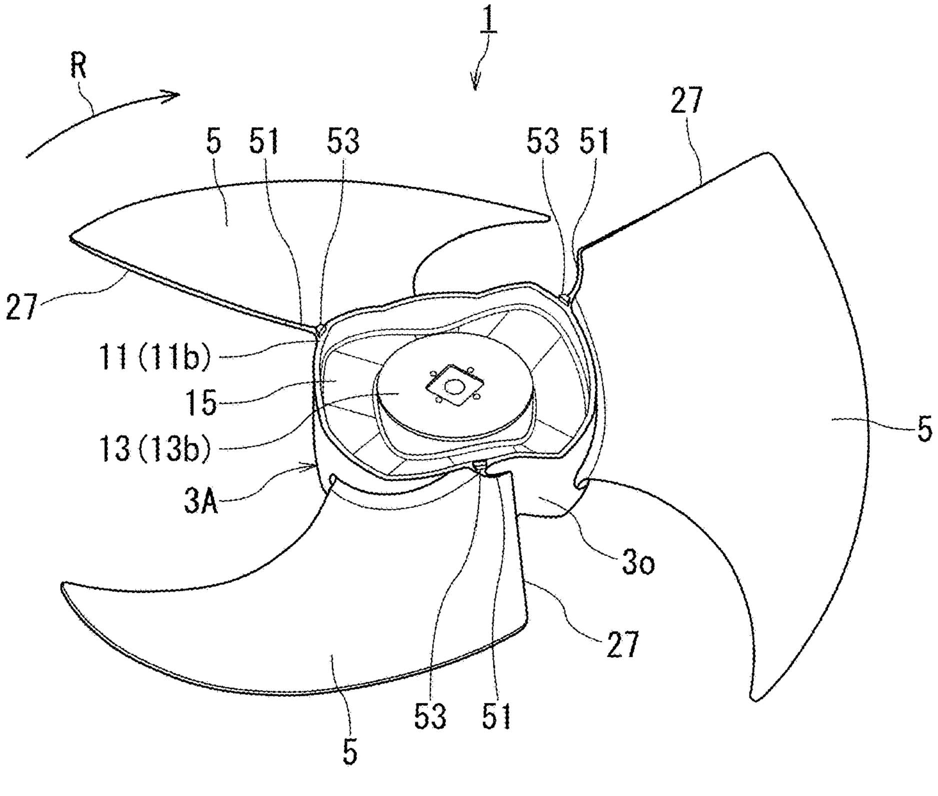
FIG. 10 is a perspective view illustrating, from the blowing side, the impeller according to the embodiment of the present invention, provided with the blade portions including a convex portion.

FIG. 10 is a perspective view illustrating, from the blowing side, the impeller according to the embodiment of the present invention, provided with the blade portions including a convex portion.

Figure 11:
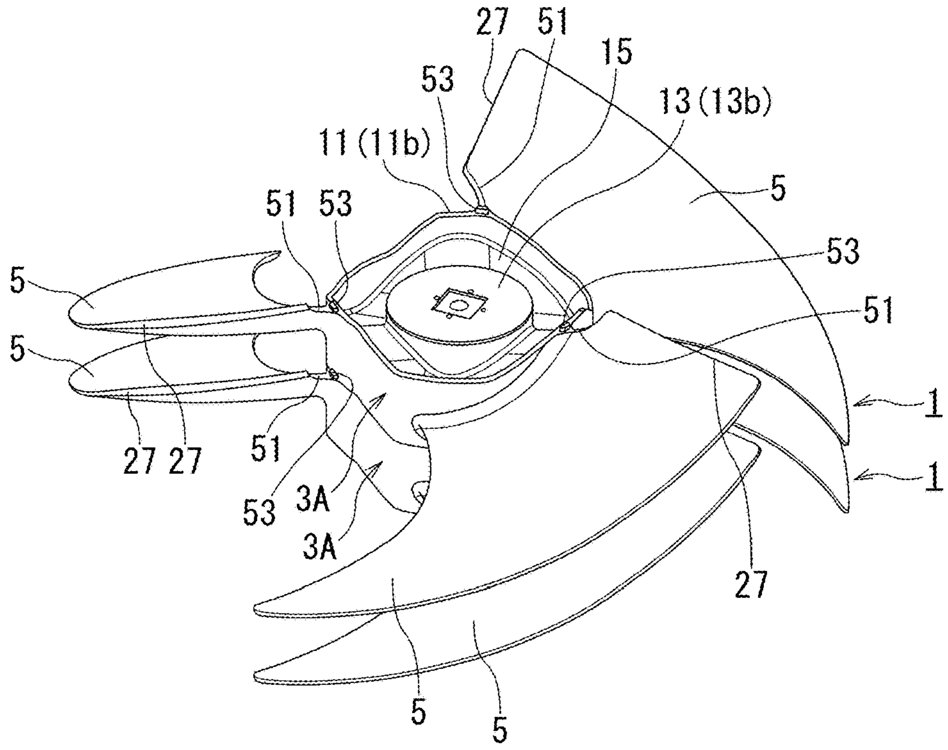
FIG. 11 is a perspective view illustrating, from the blowing side, a state where a plurality of impellers illustrated in FIG. 10 are stacked.

FIG. 11 is a perspective view illustrating, from the blowing side, a state where a plurality of impellers illustrated in FIG. 10 are stacked.

Figure 12:
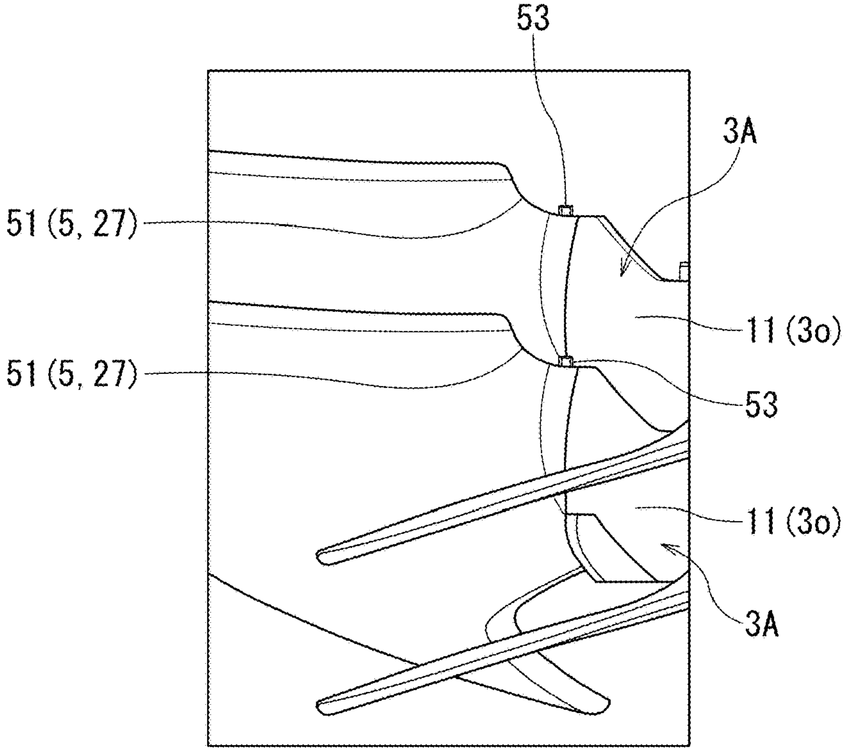
FIG. 12 is a side view illustrating a vicinity of the convex portion in FIG. 11.

FIG. 12 is a side view illustrating a vicinity of the convex portion in FIG. 11.

As illustrated in FIG. 10, the trailing edge portion 27 of each blade portion 5 may include: a trailing edge surface 51 continuous with the blowing-side end surface 11*b* of the cylindrical portion 11; and a convex portion 53 projecting from the trailing edge surface 51 toward the blowing side along the outermost edge of the blowing-side end surface 11*b*.

The number of convex portions 53 provided in the impeller 1 corresponds to the number of the plurality of blade portions 5. In the example of FIG. 10, the impeller 1 includes three blade portions 5. That is, the impeller 1 includes three convex portions 53. Similarly to the three blade portions 5, the three convex portions 53 are arranged at intervals of 120° on the outer peripheral side of the hub portion 3A in the circumferential direction of the hub portion 3A.

With such a plurality of convex portions 53, when a plurality of impellers 1 are stacked in the rotational axis direction, as illustrated in FIGS. 11 and 12, the convex portion 53 of the lower impeller 1 contacts the outer peripheral surface 3*o* of the hub portion 3A of the upper impeller 1, thereby preventing the upper impeller 1 from being displaced in the radial direction. Note that the convex portion 53 is a relatively small member. Therefore, even when the impeller 1 includes a plurality of convex portions 53, the weight of the impeller 1 does not substantially increase, and the lightness of the impeller 1 is maintained.

As illustrated back in FIG. 7B, the trailing edge portion 27 of each blade portion 5 may include a trailing edge surface 51A that is continuous with the blowing-side end surface 11*b* of the cylindrical portion 11 and extends toward the blowing side beyond the blowing-side end surface 11*b*.

The trailing edge surface 51 and the convex portion 53 illustrated in FIG. 7B by the double-dotted lines are expressed, for convenience of description, by superimposing the trailing edge surface 51 and the convex portion 53 illustrated in FIG. 10 on FIG. 7B. The trailing edge surface 51A has a similar function to the convex portions 53 by extending toward the blowing side beyond the blowing-side end surface 11*b*. That is, when a plurality of impellers 1 are stacked in the rotational axis direction, the trailing edge surface 51A of the lower impeller 1 contacts the outer peripheral surface 3*o* of the hub portion 3A of the upper impeller 1, thereby preventing the upper impeller 1 from being displaced in the radial direction. Note that such a trailing edge surface 51A can be integrally designed as a part of the blade portion 5.

Figure 13:
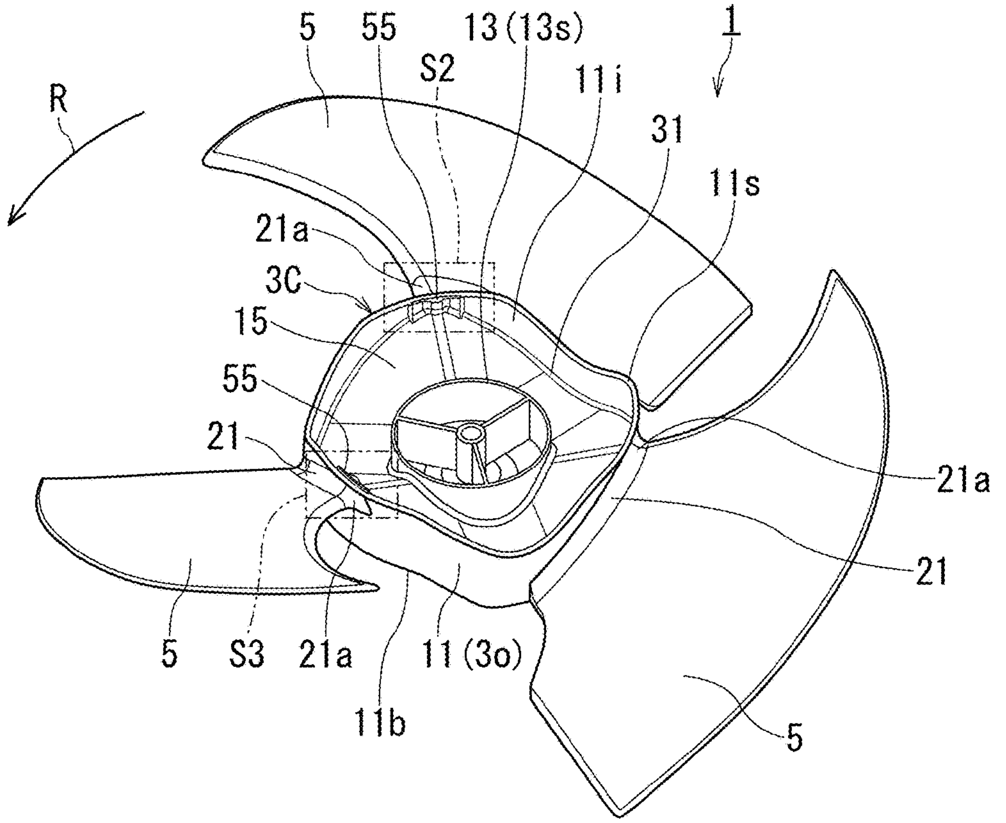
FIG. 13 is a perspective view illustrating, from a suction side, the impeller according to the embodiment of the present invention, provided with a hub portion of a fourth example.

FIG. 13 is a perspective view illustrating, from the suction side, the impeller according to the embodiment of the present invention, provided with the hub portion of the fourth aspect.

Figure 14A:
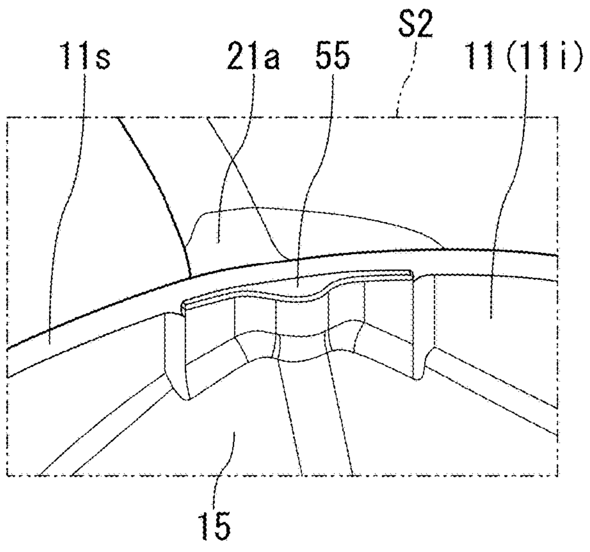
FIG. 14A is an enlarged view of a region S2 surrounded by a double-dotted square in FIG. 13.
Figure 14B:
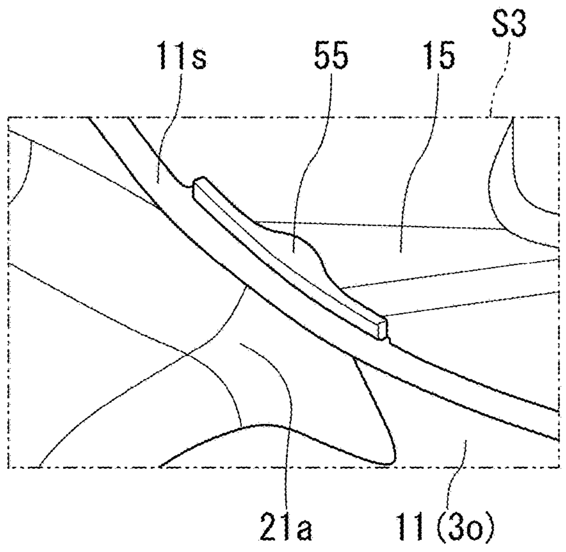
FIG. 14B is an enlarged view of a region S3 surrounded by a double-dotted square in FIG. 13.

FIG. 14A is an enlarged view of a region S2 surrounded by a double-dotted square in FIG. 13, and FIG. 14B is an enlarged view of a region S3 surrounded by a double-dotted square in FIG. 13.

As illustrated in FIG. 13, FIG. 14A, and FIG. 14B, the cylindrical portion 11 of the hub portion 3C includes a plurality of claw portions 55 provided at intervals on the inner peripheral surface 11*i* or the outer peripheral surface 3*o*, and the plurality of claw portions 55 may project toward the suction side beyond the suction-side end surface 11*s* of the cylindrical portion 11, or toward the blowing side beyond the blowing-side end surface 11*b* of the cylindrical portion 11.

The claw portions 55 are arranged in the circumferential direction of the cylindrical portion 11. The number of the plurality of claw portions 55 provided in the impeller 1 is, for example, two or more, although the number depends on the size of the claw portions 55 and the height of the claw portions 55 projecting toward the blowing side or the suction side. In the example of FIG. 13, the impeller 1 includes two claw portions 55 projecting from the inner peripheral surface 11*i* of the cylindrical portion 11 toward the suction side. The two claw portions 55 are arranged at intervals of 120° or 240° in the rotational direction R of the impeller 1.

With such a plurality of claw portions 55, when a plurality of impellers 1 are stacked in the rotational axis direction, the plurality of claw portions 55 are caught by the vertically adjacent cylindrical portions 11, thereby preventing the upper impeller 1 from being displaced in the radial direction. Even when the impeller 1 includes a plurality of claw portions 55, the weight of the impeller 1 does not substantially increase, and the lightness of the impeller 1 is maintained.

Each claw portion 55 may be provided on the inner peripheral surface 11*i* of the cylindrical portion 11 and near the front inner peripheral edge portion 21*a* of the inner peripheral edge portion 21.

To firmly fix the blade portion 5 to the cylindrical portion 11, a reinforcing member, such as a rib or a thick-walled portion, may be provided on the inner peripheral surface 11*i* side of the cylindrical portion 11 that faces the inner peripheral edge portion 21 of the blade portion 5, with the cylindrical portion 11 interposed therebetween. The claw portion 55 can be easily provided by extending a part of the reinforcing member toward the suction side or the blowing side, without excessively increasing the amount of additional material or the amount of resin forming the impeller 1.

Figure 15:
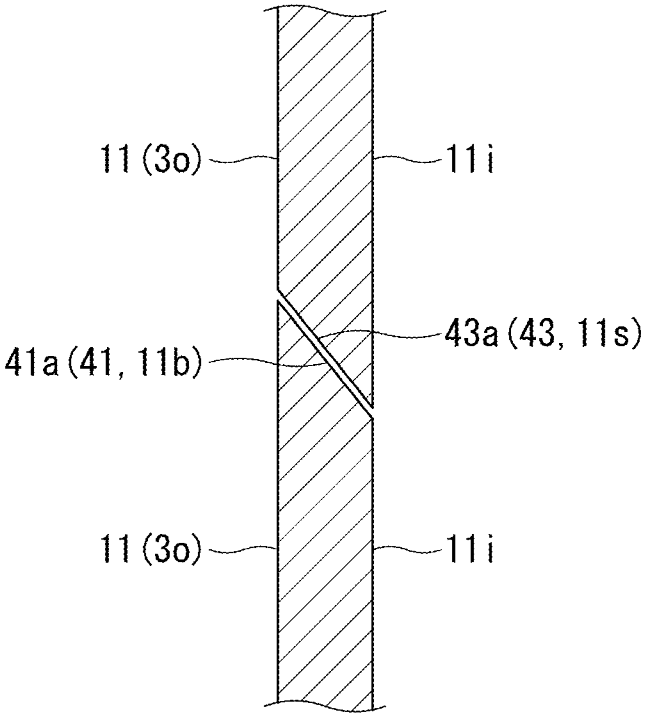
FIG. 15 is an enlarged vertical cross-sectional view of two cylindrical portions adjacent to each other vertically in a region S4 surrounded by the double-dotted square in FIG. 8.

FIG. 15 is an enlarged vertical cross-sectional view of two cylindrical portions adjacent to each other vertically in a region S4 surrounded by the double-dotted square in FIG. 8.

Note that FIG. 15 is a cross-sectional view of the region S4 cut by a plane. The plane contains the rotation center line C and is parallel to the direction along the rotation center line C.

As illustrated in FIG. 15, at least a part of the blowing-side end surface 11*b* of the cylindrical portion 11 and at least a part of the suction-side end surface 11*s* of the cylindrical portion 11 may be inclined from the outer peripheral surface 3*o* of the cylindrical portion 11 to the inner peripheral surface 11*i* of the cylindrical portion 11. In other words, the at least a part of the blowing-side end surface 11*b* and the at least a part of the suction-side end surface 11*s* may be inclined in the radial direction (thickness direction) of the cylindrical portion 11. In this case, the at least a part of the blowing-side end surface 11*b* is positioned so as to face the at least a part of the suction-side end surface 11*s* in the rotation axis direction.

With such at least a part of the blowing-side end surface 11*b* and at least a part of the suction-side end surface 11*s*, when a plurality of impellers 1 are stacked in the rotational axis direction, the at least a part of the suction-side end surface 11*s* of the upper cylindrical portion 11 and the at least a part of the blowing-side end surface 11*b* of the lower cylindrical portion 11 contact each other in the vertically adjacent cylindrical portions 11, thereby preventing the upper impeller 1 from being displaced in the radial direction.

In the example of FIG. 15, the at least a part of the blowing-side end surface 11*b* of the cylindrical portion 11 includes the plurality of first inclined portions 41*a*, and the at least a part of the suction-side end surface 11*s* of the cylindrical portion 11 includes the plurality of second inclined portions 43*a*. However, the at least a part of the blowing-side end surface 11*b* and the at least a part of the suction-side end surface 11*s* are not limited to the above. The at least a part of the blowing-side end surface 11*b* may include parts of the blowing-side end surface 11*b* other than the first inclined portion 41*a*, and the at least a part of the suction-side end surface 11*s* may include parts of the suction-side end surface 11*s* other than first inclined portion 43*a*. The at least a part of the blowing-side end surface 11*b* and the at least a part of the suction-side end surface 11*s* may be inclined toward the suction side, from the outer peripheral surface 3*o* of the cylindrical portion 11 to the inner peripheral surface 11*i* of the cylindrical portion 11, or may be inclined toward the blowing side, from the outer peripheral surface 3*o* of the cylindrical portion 11 to the inner peripheral surface 11*i* of the cylindrical portion 11.

As described above, the impeller 1 according to the present embodiment includes the corrugated-plate-shaped connecting portion 15 that connects the inner peripheral surface 11*i* of the cylindrical portion 11 and the outer peripheral surface 13*o* of the boss portion 13. Therefore, the impeller 1 can reduce the weight of the hub portion 3 while reducing stress, which is centrifugal load generated in the hub portion 3 when the impeller 1 is rotated in the rotational direction R, compared to the impeller of conventional structure that includes: the flat connecting portion having a flat-plate shape and connecting the inner peripheral surface of the hub portion and the outer peripheral surface of the boss portion; and the rib portion erected from the plane of the connecting portion and connecting the inner peripheral surface of the hub portion and the outer peripheral surface of the boss portion. That is, the impeller 1 can achieve excellent lightness while increasing rigidity.

The impeller 1 according to the present embodiment includes the connecting portion 15 including the cylindrical-portion-side edge portion 31 that is provided along the inner peripheral edge portion 21 of the blade portion 5, with the cylindrical portion 11 interposed therebetween. Therefore, during cooling after injection molding of the impeller 1, the cylindrical-portion-side edge portion 31 of the connecting portion 15 and the inner peripheral edge portion 21 of the blade portion 5 evenly contract, with the cylindrical portion

11 interposed therebetween, thereby reducing the occurrence of a sink mark in the impeller 1. Furthermore, the impeller 1 can improve lightness by removing the part of the cylindrical portion 11 where the cylindrical-portion-side edge portion 31 of the connecting portion 15 and the inner peripheral edge portion 21, which is the root of the blade portion 5, are not provided, without reducing rigidity.

The impeller 1 according to the present embodiment is provided with the cylindrical portion 11 that includes: a plurality of first notch portions 41 provided substantially along the first virtual line VL1, which corresponds to the blowing-side edge 31*b* of the cylindrical-portion-side edge portion 31 of the connecting portion 15 offset toward the blowing side; and a plurality of second notch portions 43 provided substantially along the second virtual line VL2, which corresponds to the suction-side edge 31*s* of the cylindrical-portion-side edge portion 31 of the connecting portion 15 offset toward the suction side. That is, the impeller 1 includes a plurality of first notch portions 41 and a plurality of second notch portions 43 in the cylindrical portion 11 so as to avoid both the cylindrical-portion-side edge portion 31 of the connecting portion 15 and the inner peripheral edge portion 21 of the blade portion 5. Therefore, the impeller 1 can further improve the lightness without impairing the rigidity.

The impeller 1 according to the present embodiment includes the connecting portion 15 including a plurality of drain holes 45. Therefore, when the impeller 1 is applied to the outdoor fan of the outdoor unit in the air conditioner, moisture, such as rainwater and snowmelt, that accumulates in the hub portion 3B can be properly drained. The impeller 1 can further improve the lightness by providing a plurality of drain holes 45.

The impeller 1 according to the present embodiment includes a plurality of blade portion 5, each including: a trailing edge surface 51 continuous with the blowing-side end surface 11*b* of the cylindrical portion 11; and a convex portion 53 projecting from the trailing edge surface 51 toward the blowing side along the outermost edge of the blowing-side end surface 11*b*. With such an impeller 1, collapse of cargo can be prevented when a plurality of impellers 1 are stacked.

The impeller 1 according to the present embodiment includes a plurality of blade portion 5, each including the trailing edge surface 51A that is continuous with the blowing-side end surface 11*b* of the cylindrical portion 11 and extends toward the blowing side beyond the blowing-side end surface 11*b*. With such an impeller 1, collapse of cargo can be prevented when a plurality of impellers 1 are stacked.

The impeller 1 according to the present embodiment includes the cylindrical portion 11 provided at intervals on the inner peripheral surface 11*i* or the outer peripheral surface 3*o* and including a plurality of claw portions 55 that projects toward the suction side beyond the suction-side end surface 11*s* of the cylindrical portion 11, or toward the blowing side beyond the blowing-side end surface 11*b* of the cylindrical portion 11. With such an impeller 1, collapse of cargo can be prevented when a plurality of impellers 1 are stacked.

In the impeller 1 according to the present embodiment, the at least a part of the blowing-side end surface 11*b* and the at least a part of the suction-side end surface 11*s* are inclined from the outer peripheral surface 3*o* of the cylindrical portion 11 to the inner peripheral surface 11*i* of the cylindrical portion 11. Furthermore, the at least a part of the blowing-side end surface 11*b* is positioned so as to face the at least a part of the suction-side end surface 11*s* in the rotation axis direction. With such an impeller 1, collapse of cargo can be prevented when a plurality of impellers 1 are stacked.

Therefore, the impeller 1 according to the present embodiment can improve lightness while having high rigidity.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An impeller comprising:

a hub portion comprising:

a cylindrical portion including an outer peripheral surface and an inner peripheral surface, a boss portion configured to accept an output shaft of an electric motor, the boss portion having a cylindrical shape and being disposed at a center of the cylindrical portion, and a connecting portion having a corrugated-plate shape and connecting the inner peripheral surface of the cylindrical portion and an outer peripheral surface of the boss portion, the corrugated-plate shape comprising at least one alternating ridge-and-groove portion extending from the inner peripheral surface of the cylindrical portion and the outer peripheral surface of the boss portion; and a plurality of blade portions connected to the outer peripheral surface, wherein the connecting portion includes a cylindrical-portion-side edge portion extending along the inner peripheral surface of the cylindrical portion, each of the blade portions includes an inner peripheral edge portion extending along the outer peripheral surface of the cylindrical portion, the cylindrical-portion-side edge portion of the connecting portion is provided along the inner peripheral edge portion, with the cylindrical portion interposed between the cylindrical-portion-side edge portion and the inner peripheral edge portion, the cylindrical-portion-side edge portion of the connecting portion includes:

a blowing-side edge located on a blowing side, and a suction-side edge located on a suction side, the cylindrical portion includes:

a blowing-side end surface located on the blowing side, a suction-side end surface located on the suction side, a plurality of first notch portions provided substantially along a first virtual line, the first virtual line corresponding to the blowing-side edge offset toward the blowing side, and a plurality of second notch portions provided substantially along a second virtual line, the second virtual line corresponding to the suction-side edge offset toward the suction side, and the blowing-side end surface and the suction-side end surface each have a corrugated shape.

2. The impeller according to claim 1, wherein each of the blade portions includes a trailing edge portion located on a rear side in a rotational direction, and the trailing edge portion includes:

a trailing edge surface continuous with the blowing-side end surface, and a convex portion projecting from the trailing edge surface toward the blowing side along an outermost edge of the blowing-side end surface.

3. The impeller according to claim 1, wherein each of the blade portions includes a trailing edge portion located on a rear side in a rotational direction, and the trailing edge portion includes a trailing edge surface that is continuous with the blowing-side end surface and extends toward the blowing side beyond the blowing-side end surface.

4. The impeller according to claim 1, wherein the cylindrical portion includes a plurality of claw portions provided at an interval on the inner peripheral surface of the cylindrical portion or the outer peripheral surface of the cylindrical portion, and the plurality of claw portions project toward the suction side beyond the suction-side end surface, or toward the blowing side beyond the blowing-side end surface.

5. The impeller according to claim 1, wherein at least a part of the blowing-side end surface and at least a part of the suction-side end surface are inclined from the outer peripheral surface of the cylindrical portion to the inner peripheral surface of the cylindrical portion, and the at least a part of the blowing-side end surface is positioned facing the at least the part of the suction-side end surface in a rotation axis direction.

6. An impeller comprising:

a hub portion comprising:

a cylindrical portion including an outer peripheral surface and an inner peripheral surface, a boss portion configured to accept an output shaft of an electric motor, the boss portion having a cylindrical shape and being disposed at a center of the cylindrical portion, and a connecting portion having a corrugated-plate shape and connecting the inner peripheral surface of the cylindrical portion and an outer peripheral surface of the boss portion, the corrugated-plate shape comprising at least one alternating ridge-and-groove portion extending from the inner peripheral surface of the cylindrical portion and the outer peripheral surface of the boss portion; and a plurality of blade portions connected to the outer peripheral surface, wherein the connecting portion includes a plurality of drain holes.

7. The impeller according to claim 6, wherein the cylindrical portion includes a blowing-side end surface located on a blowing side, each of the blade portions includes a trailing edge portion located on a rear side in a rotational direction, and the trailing edge portion includes:

a trailing edge surface continuous with the blowing-side end surface, and a convex portion projecting from the trailing edge surface toward the blowing side along an outermost edge of the blowing-side end surface.

8. The impeller according to claim 6, wherein the cylindrical portion includes a blowing-side end surface located on a blowing side, each of the blade portions includes a trailing edge portion located on a rear side in a rotational direction, and the trailing edge portion includes a trailing edge surface that is continuous with the blowing-side end surface and extends toward the blowing side beyond the blowing-side end surface.

9. The impeller according to claim 6,
wherein the cylindrical portion includes:
a blowing-side end surface located on a blowing side,
a suction-side end surface located on a suction side, and
a plurality of claw portions provided at an interval on the inner peripheral surface of the cylindrical portion or the outer peripheral surface of the cylindrical portion, and
the plurality of claw portions project toward the suction side beyond the suction-side end surface, or toward the blowing side beyond the blowing-side end surface.

10. The impeller according to claim 6,
wherein the cylindrical portion includes:
a blowing-side end surface located on a blowing side, and
a suction-side end surface located on a suction side,
at least a part of the blowing-side end surface and at least a part of the suction-side end surface are inclined from the outer peripheral surface of the cylindrical portion to the inner peripheral surface of the cylindrical portion, and
the at least a part of the blowing-side end surface is positioned facing the at least the part of the suction-side end surface in a rotation axis direction.

11. An impeller comprising:
a hub portion comprising:
a cylindrical portion including an outer peripheral surface and an inner peripheral surface,
a boss portion configured to accept an output shaft of an electric motor, the boss portion having a cylindrical shape and being disposed at a center of the cylindrical portion, and
a connecting portion having a corrugated-plate shape and connecting the inner peripheral surface of the cylindrical portion and an outer peripheral surface of the boss portion, the corrugated-plate shape comprising at least one alternating ridge-and-groove portion extending from the inner peripheral surface of the cylindrical portion and the outer peripheral surface of the boss portion; and
a plurality of blade portions connected to the outer peripheral surface,
wherein the cylindrical portion includes a blowing-side end surface located on a blowing side,
each of the blade portions includes a trailing edge portion located on a rear side in a rotational direction, and
the trailing edge portion includes a trailing edge surface that is continuous with the blowing-side end surface and extends toward the blowing side beyond the blowing-side end surface.

12. An impeller comprising:
a hub portion comprising:
a cylindrical portion including an outer peripheral surface and an inner peripheral surface,
a boss portion configured to accept an output shaft of an electric motor, the boss portion having a cylindrical shape and being disposed at a center of the cylindrical portion, and
a connecting portion having a corrugated-plate shape and connecting the inner peripheral surface of the cylindrical portion and an outer peripheral surface of the boss portion, the corrugated-plate shape comprising at least one alternating ridge-and-groove portion extending from the inner peripheral surface of the cylindrical portion and the outer peripheral surface of the boss portion; and
a plurality of blade portions connected to the outer peripheral surface,
wherein the cylindrical portion includes:
a blowing-side end surface located on a blowing side, and
a suction-side end surface located on a suction side,
at least a part of the blowing-side end surface and at least a part of the suction-side end surface are inclined from the outer peripheral surface of the cylindrical portion to the inner peripheral surface of the cylindrical portion, and
the at least a part of the blowing-side end surface is positioned facing the at least the part of the suction-side end surface in a rotation axis direction.

* * * * *